United States Patent
Chamberlain et al.

(10) Patent No.: US 6,997,983 B2
(45) Date of Patent: Feb. 14, 2006

(54) PERYLENE PIGMENT COMPOSITION AND PROCESS THEREFOR

(75) Inventors: Terence Richard Chamberlain, Montgomery, OH (US); Donald Thomas DeRussy, Mason, OH (US); Michael John Lemmons, Fort Thomas, KY (US)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 10/787,677

(22) Filed: Feb. 26, 2004

(65) Prior Publication Data

US 2005/0188895 A1    Sep. 1, 2005

(51) Int. Cl.
*C09B 67/20*    (2006.01)
*C07D 471/02*    (2006.01)

(52) U.S. Cl. .................. 106/493; 546/37; 106/498; 106/23 R

(58) Field of Classification Search ................. 106/493, 106/498, 23 R; 546/37
See application file for complete search history.

(56) References Cited

U.S. PATENT DOCUMENTS

| | | | |
|---|---|---|---|
| 4,153,602 A | 5/1979 | Schiessler et al. | 546/37 |
| 4,189,582 A | 2/1980 | Hoch et al. | 546/37 |
| 5,145,964 A | 9/1992 | Schütze et al. | 546/37 |
| 6,174,361 B1 | 1/2001 | Urban et al. | 106/498 |
| 6,235,099 B1 | 5/2001 | Aida et al. | 106/31.65 |
| 6,391,104 B1 | 5/2002 | Schulz | 106/494 |
| 2003/0106463 A1 | 6/2003 | Hackman et al. | 106/498 |
| 2004/0200388 A1 | 10/2004 | Hackmann et al. | 106/493 |

FOREIGN PATENT DOCUMENTS

| | | |
|---|---|---|
| DE | 27 26 682 | 12/1978 |
| GB | 923721 | 4/1963 |
| GB | 1 226 414 | 3/1971 |
| WO | 01/68650 | 9/2001 |

OTHER PUBLICATIONS

Eastman Chemical Company, Dymerex rosins, XP002333763, 1 sheet from the internet, (Jun. 2005).
Eastman Chemical Company, Poly-Pale rosin resins, XP002333764, 1 sheet from the internet, (Jun. 2005).

*Primary Examiner*—Charanjit S. Aulakh
(74) *Attorney, Agent, or Firm*—Kevin T. Mansfield

(57) ABSTRACT

A process for the manufacture of a pigments form of perylene-3,4,9,10-tetracarboxylic acid N,N'-bis-methylimide having a transparent clean yellowish shade, comprises comminution of a mixture comprising perylene-3,4,9,10-tetracarboxylic acid N,N'-bis-methylimide produced by methylation of perylenetetracarboxylic imide with an alkylating agent and perylene-3,4,9,10-tetracarboxylic acid N,N'-bis-methylimide produced by the condensation of perylenetetracarboxylic anhydride with methylamine, in the presence of dimerized rosin. The pigments obtainable are notable for their outstanding coloristic and rheological properties and are suitable for use in a variety of applications.

21 Claims, No Drawings

PERYLENE PIGMENT COMPOSITION AND PROCESS THEREFOR

The present invention relates to of a tinctorially valuable pigments form of perylene-3,4,9,10-tetracarboxylic acid N,N'-bis-methylimide (C.I. Pigment Red 179) and to a process for its manufacture. In particular it relates to a transparent clean yellowish shade of said red perylene pigment.

Perylene-3,4,9,10-tetracarboxylic acid N,N'-bis-methylimide of the formula

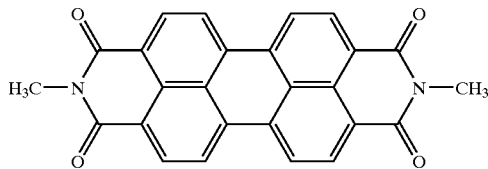

has been known as a pigment for many years. The pigment is manufactured (method 1) by reacting perylene-3,4,9,10-tetracarboxylic acid dianhydride with methylamine (see U.S. Pat. No. 4,153,602 for example); (method 2) by methylating perylene-3,4,9,10-tetracarboxylic acid diimide in the presence of an alkali, for example with methyl chloride (see GB 923,721) or dimethyl sulfate or carbonate; or (method 3) by fusing naphthalic acid N-methylimide with an alkali metal hydroxide (German Patent No. 276,357).

Depending on the process of manufacture, the crude pigments give pigments forms that produce red or dull reddish brown hues.

According to U.S. Pat. No. 4,189,582, the disclosure of which is incorporated by reference, red pigments of perylene-3,4,9,10-tetracarboxylic acid N,N'-bis-methylimide are only obtained when the pigment has been manufactured by method 1. In contrast, methods 2 and 3 always give dull reddish brown products which even after comminution and finishing, for example by the processes described in German Published Application DAS 1,272,270 (=GB 923,721), give only dull reddish brown pigments.

Now, surprisingly, it has been found that comminution of a mixture comprising perylene-3,4,9,10-tetracarboxylic acid N,N'-bis-methylimide produced by methylation of perylenetetracarboxylic imide with an alkylating agent (method 2 above) and perylene-3,4,9,10-tetracarboxylic acid N,N'-bis-methylimide produced by the condensation of perylenetetracarboxylic anhydride with methylamine, (method 1 above), in the presence of dimerized rosin, produces a tinctorially valuable pigments form of perylene-3,4,9,10-tetracarboxylic acid N,N'-bis-methylimide having a transparent clean yellowish shade of said red perylene pigment.

Hence one aspect of the present invention is a process for the manufacture of a pigments form of perylene-3,4,9,10-tetracarboxylic acid N,N'-bis-methylimide having a transparent clean yellowish shade, which comprises comminution of a mixture comprising perylene-3,4,9,10-tetracarboxylic acid N,N'-bis-methylimide produced by methylation of perylenetetracarboxylic imide with an alkylating agent (method 2) and perylene-3,4,9,10-tetracarboxylic acid N,N'-bis-methylimide produced by the condensation of perylenetetracarboxylic anhydride with methylamine, (method 1), in the presence of dimerized rosin.

Another aspect of the present invention is a pigments form of perylene-3,4,9,10-tetracarboxylic acid N,N'-bis-methylimide having a transparent clean yellowish shade, which is produced by a process which comprises comminution of a mixture comprising perylene-3,4,9,10-tetracarboxylic acid N,N'-bis-methylimide produced by methylation of perylenetetracarboxylic imide with an alkylating agent (method 2) and perylene-3,4,9,10-tetracarboxylic acid N,N'-bis-methylimide produced by the condensation of perylenetetracarboxylic anhydride with methylamine, (method 1), in the presence of dimerized rosin.

Comminution of a mixture comprising perylene-3,4,9,10-tetracarboxylic acid N,N'-bis-methylimide produced by methods 1 and 2 in the presence of dimerized rosin can be carried out by a variety of techniques which are known in the pigments art, for example by wet milling and by salt attrition. Conveniently pigment crudes are employed. Wet milling of perylenes is described in U.S. Pat. No. 6,154,361.

The ratio of perylene-3,4,9,10-tetracarboxylic acid N,N'-bis-methylimide produced by method 1 to that produced by method 2 can vary considerably. Preferred ratios are 35-90 parts by weight of perylene-3,4,9,10-tetracarboxylic acid N,N'-bis-methylimide produced by method 1 to 65-10 parts by weight of perylene-3,4,9,10-tetracarboxylic acid N,N'-bis-methylimide produced by method 2, in particular 40-70 parts produced by method 1 to 60-30 parts produced by method 2 and especially 45-60 parts produced by method 1 to 55-40 parts produced by method 2.

In one embodiment comminution of the mixture is carried out by salt attrition. Salt attrition of perylene-3,4,9,10-tetracarboxylic acid N,N'-bis-methylimide is known for example from U.S. Pat. Nos. 5,145,964 and 6,235,099.

According to the present invention conveniently 6 to 12 parts of salt, in particular 8 to 10 parts of salt by weight per part of the pigment mixture are employed for the salt attrition. Additionally the attrition mixture advantageously contains from 1 to 2 parts by weight of a water-soluble alcohol such as a lower alcohol, ethylene or propylene glycol, diethyleneglycol or, preferably, glycerin, plus a small amount of a base, for example 0.005 to 0.05 parts, especially 0.01 to 0.04 parts by weight of a base such as an alkali metal hydroxide, for example sodium or potassium hydroxide, per part of the pigment mixture.

The attrition mixture additionally contains from 0.02 to 0.4 parts by weight of dimerized rosin, in particular 0.06 to 0.25 parts and especially 0.1 to 0.2 parts by weight per part of the pigment mixture.

Surprisingly, the inclusion of dimerized rosin during the attrition process not only affords a PR 179 product with superior transparency and color properties but also with superior rheological properties in solvent borne OEM paints.

Typically the comminution of the mixture is carried out for 3 to 18 hours, in particular for 5 to 16 hours and especially for 8 to 12 hours. The temperature rises as the attrition proceeds, typically eventually reaching a range of about 88 to 105° C. after several hours. Preferably temperatures above about 110° C. are avoided.

After completion of the attrition, the mixture is drowned into water to dissolve the salt and alcohol, isolated by filtration, washed with water, suspended in water and acidified to a pH of less than 1.0 with 35–36% HCl, recovered by filtration, washed with water, dispersed in deionized water to afford a suspension, typically about a 15% (w/v) suspension, and spray dried to afford a dry finished product. This product can then be blended by micropulverizing using conventional equipment, for example a hammer mill.

Analysis indicates that the dimer rosin is substantially retained in the product.

The pigments obtainable in accordance with the present invention are notable for their outstanding coloristic and rheological properties, especially for outstanding rheology, high flocculation stability, high transparency, ease of dispersion, good gloss properties, high color strength, excellent solvent fastness and fastness to overcoating, and very good weather fastness. They are suitable for use in both solvent-borne and aqueous systems.

Thus another aspect of the present invention is a perylene-3,4,9,10-tetracarboxylic acid N,N'-bis-methylimide pigment having a transparent clean yellowish shade, which is produced by a process which comprises comminution of a mixture comprising perylene-3,4,9,10-tetracarboxylic acid N,N'-bis-methylimide produced by methylation of perylenetetracarboxylic imide with an alkylating agent (method 2) and perylene-3,4,9,10-tetracarboxylic acid N,N'-bis-methylimide produced by the condensation of perylenetetracarboxylic anhydride with methylamine, (method 1), in the presence of dimerized rosin.

Preferably said pigment is produced by a process which comprises comminution of a mixture comprising 65-10 parts by weight of perylene-3,4,9,10-tetracarboxylic acid N,N'-bis-methylimide produced by methylation of perylenetetracarboxylic imide with an alkylating agent (method 2) and 35-90 parts by weight of perylene-3,4,9,10-tetracarboxylic acid N,N'-bis-methylimide produced by the condensation of perylenetetracarboxylic anhydride with methylamine, (method 1), in the presence of from 0.02 to 0.4 parts by weight of dimerized rosin.

The inventive perylene pigment is particularly suitable for preparing coatings conventionally employed in the automobile industry, especially in acrylic/melamine resin, alkyd/melamine resin or thermoplastic acrylic resin systems, as well as in aqueous based coating systems. When applied in solvent borne paints, the product of the above invention affords a very transparent coating that exhibits an attractive clean yellow shade of red compared to most other PR 179 products. In addition, it readily disperses into the currently preferred OEM paint systems due to its superior rheological properties. As a consequence, paint dispersions with higher pigment loadings can be produced, thus providing extra value in use for the customer.

The inventive pigment shows excellent pigment properties and may be applied alone or in the presence of other pigments or dyes in multicoat, such as basecoat/clearcoat, as well as monocoat automotive or industrial paint and ink systems.

High molecular weight organic materials that are used in heat-curable coatings or cross-linked, chemically-reactive coatings, may also be colored with the inventive pigment. The pigmented, high molecular weight organic materials prepared according to the present invention are especially useful in stoving finishes which contain customary binders and which are reactive at high temperature. These stoving finishes can be obtained from solvent or aqueous or powder paint systems known in the art. Examples of pigmented, high molecular weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present invention are also useful as air-drying or physically-drying coatings.

The perylene compounds of the invention are also suitable as colorants in powders and powder coating materials, especially in triboelectrically or electrokinetically sprayable powder coating materials which are used to coat the surfaces of articles made, for example, of metal, wood, plastic, glass, ceramic, concrete, textile material, paper or rubber (J. F. Hughes, "Electrostatics Powder Coating" Research Studies, John Wiley & Sons, 1984).

Typical powder coating resins employed are epoxy resins, carboxyl- and hydroxyl-containing polyester resins, polyurethane resins and acrylic resins, together with customary hardeners. Combinations of resins are also used. For example, epoxy resins are frequently employed in combination with carboxyl- and hydroxyl-containing polyester resins. Typical hardener components (depending on the resin system) are, for example, acid anhydrides, imidazoles and also dicyandiamide and its derivatives, blocked isocyanates, bisacylurethanes, phenolic and melamine resins, triglycidyl isocyanurates, oxazolines and dicarboxylic acids.

The pigments prepared in accordance with the invention can be used for pigmenting (coloring) high molecular weight organic materials of natural or synthetic origin.

Examples of high molecular weight organic materials which can be pigmented with said pigments are cellulose ethers and cellulose esters, such as ethylcellulose, nitrocellulose, cellulose acetate or cellulose butyrate, natural resins and synthetic resins, such as addition-polymerization resins or condensation resins, examples being amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

Thus, the present invention relates to a method of coloring a high molecular weight organic material which comprises incorporating an effective pigmenting amount of the inventive perylene pigment into the high molecular weight organic material and to a composition comprising a high molecular weight organic material and an effective pigmenting amount of the inventive perylene pigment.

An effective pigmenting amount is any amount suitable to provide the desired color in the high molecular weight organic material. In particular, the inventive pigment is used in an amount of 0.01 to 30% by weight, preferably 0.1 to 10% by weight, based on the weight of the high molecular weight organic material to be pigmented.

It is irrelevant whether the high molecular weight organic compounds referred to are in the form of plastic masses, melts, spinning solutions, varnishes, paints or printing inks.

The perylene pigments according to the invention are suitable as colorants in electrophoto-graphic toners and developers, such as one- or two-component powder toners (also called one- or two-component developers), magnetic toners, liquid toners, polymerization toners and specialty toners.

Typical toner binders are addition polymerization, polyaddition and polycondensation resins, such as styrene, styrene-acrylate, styrene-butadiene, acrylate, polyester and phenol-epoxy resins, polysulfones, polyurethanes, individually or in combination, and also polyethylene and polypropylene, which may include further constituents, such as charge control agents, waxes or flow assistants, or may be modified subsequently with these additives.

Furthermore, the perylenes according to the invention are suitable for use as colorants in inkjet inks on either an aqueous or nonaqueous basis and in those inks which operate in accordance with the hotmelt technique.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

EXAMPLE 1

An attrition mixture is prepared comprising the following proportions of the following components:

|  | Parts w/w |
| --- | --- |
| Crude # 1 + Crude # 2: (0.50 + 0.50) | 1.00 |
| Polypale dimerized rosin | 0.15 |
| Potassium hydroxide | 0.02 |
| Glycerol | 1.64 |
| Salt | 9.0. |

Crude #1 is perylene-3,4,9,10-tetracarboxylic acid N,N'-bis-methylimide produced by the condensation of perylenetetracarboxylic anhydride (PTCA) with methylamine, (described above as method 1) and Crude #2 is perylene-3,4,9,10-tetracarboxylic acid N,N'-bis-methylimide produced by methylation of perylenetetracarboxylic imide (PTCI) with an alkylating agent (described above as method 2). Polypale dimerized rosin is a product of Eastman Chemical Company.

The attrition is performed in a laboratory mix-muller or kneader at 80–90° C. for 5 hours. At the completion of the attrition the mixture is drowned into water at 95–100° C. with efficient agitation to dissolve the salt and glycerol. After 6 hours the product is recovered by filtration. The filtercake is washed with water until the conductivity of the effluent is equivalent to that of the wash water. The washed filtercake is suspended in water at ambient temperature and a solution of HCl (35–36%) is added until the mixture has a pH<1.0. After agitating the mixture for 2 hours the product is recovered by filtration. The filtercake is washed with water until the effluent pH and conductivity values are equivalent to those of the wash water.

The washed filtercake is then dispersed in deionized water to afford a suspension with a concentration of 15% (w/v). The latter is now pumped through a spray dryer to afford a dry finished product. Analysis indicates that the dimer rosin is substantially retained in the product.

EXAMPLE 2

Various pigments are prepared analogously to Example 1. After micropulverizing in a hammer mill or similar apparatus, the pigment powders are incorporated into standard tinted paint formulations and applied to panels. The results are shown below.

Transparency Ratio (TR) relative to standard in masstone; tint strength and color values compared to standard in tinted paint

| Example # | Attrition conditions | Trans Ratio[1] DEspl/DEstd | Tint Str. % | Tint Da | Tint Db |
| --- | --- | --- | --- | --- | --- |
| 2 | crude #2, glycerol/2% KOH, 2.5 hr. | 1.16 | 88.89 | −1.78 | −1.12 |
| 3 | crude #1, glycerol/2% KOH, 2.5 hr. | 2.21 | 79.93 | 1.52 | −0.93 |
| 4 | 40:60 #1:#2, glycerol/2% KOH, 2.5 hr. | 1.23 | 89.43 | −0.73 | −0.60 |
| 5 | 40:60 #1:#2, glycerol/2% KOH, 10% PP[2], 2.5 hr. | 0.92 | 95.70 | −0.89 | 0.12 |
| 6 | 50:50 #1:#2, glycerol/2% KOH, 10% PP, 5.0 hr. | 0.95 | 99.83 | 0.44 | −1.66 |
| 1 | 50:50 #1:#2, glycerol/2% KOH, 15% PP, 5.0 hr. | 0.91 | 107.00 | 0.62 | −0.77 |

[1]The product is more transparent than standard when TR < 1.0, more opaque when TR > 1.0
[2]PP = Polypale dimerized rosin, a product of Eastman Chemical Company. The standard is Paliogen ® Red L 3875, a commercially available PR 179 from BASF.

As can be seen from the table, the best combination of Transparency Ratio (TR) relative to standard in masstone; and tint strength and color values is obtained with the product of Example 1.

What is claimed is:

1. A process for the manufacture of a pigmentary form of perylene-3,4,9,10-tetracarboxylic acid N,N'-bis-methylimide having a transparent clean yellowish shade, which comprises comminution of a mixture comprising perylene-3,4,9,10-tetracarboxylic acid N,N'-bis-methylimide produced by methylation of perylenetetracarboxylic imide with an alkylating agent (method 2) and perylene-3,4,9,10-tetracarboxylic acid N,N'-bis-methylimide produced by the condensation of perylenetetracarboxylic anhydride with methylamine, (method 1), in the presence of dimerized rosin.

2. A process according to claim 1, wherein pigment crudes are employed.

3. A process according to claim 1, which comprises comminution of a mixture comprising 35-90 parts by weight of perylene-3,4,9,10-tetracarboxylic acid N,N'-bis-methylimide produced by method 1 and 65-10 parts by weight of perylene-3,4,9,10-tetracarboxylic acid N,N'-bis-methylimide produced by method 2.

4. A process according to claim 3, which comprises comminution of a mixture comprising 40 to 70 parts by weight of perylene-3,4,9,10-tetracarboxylic acid N,N'-bis-methylimide produced by method 1 to 60 to 30 parts by weight of perylene-3,4,9,10-tetracarboxylic acid N,N'-bis-methylimide produced by method 2.

5. A process according to claim 1, wherein comminution of the pigment mixture is carried out by salt attrition.

6. A process according to claim 5, wherein the mixture additionally contains from 0.02 to 0.4 parts by weight of dimerized rosin by weight per part of the pigment mixture.

7. A process according to claim 6, wherein the mixture additionally contains from 1 to 2 parts by weight of a water-soluble alcohol and 0.005 to 0.05 parts by weight of a base.

8. A process according to claim 7, wherein the water-soluble alcohol is a lower alcohol, ethylene or propylene glycol, diethyleneglycol or glycerin.

9. A process according to claim 8, wherein the water-soluble alcohol is glycerin.

10. A process according to claim 7, wherein the base comprises 0.01 to 0.04 parts of an alkali metal hydroxide.

11. A process according to claim 5, wherein the comminution of the mixture is carried out for 3 to 18 hours.

12. A process according to claim 1, which comprises comminution of a mixture comprising 40 to 70 parts by weight of perylene-3,4,9,10-tetracarboxylic acid N,N'-bis-methylimide produced by method 1 and 60 to 30 parts by weight of perylene-3,4,9,10-tetracarboxylic acid N,N'-bis-methylimide produced by method 2 by salt attrition in the presence of from 6 to 12 parts of salt, 0.02 to 0.4 parts by weight of dimerized rosin, 1 to 2 parts of glycerin and 0.1 to 0.4 parts of an alkali metal hydroxide by weight, each per part of the pigment mixture.

13. A perylene-3,4,9,10-tetracarboxylic acid N,N'-bis-methylimide pigment having a transparent clean yellowish shade, which is produced by a process which comprises comminution of a mixture comprising perylene-3,4,9,10-tetracarboxylic acid N,N'-bis-methylimide produced by methylation of perylenetetracarboxylic imide with an alkylating agent (method 2) and perylene-3,4,9,10-tetracarboxylic acid N,N'-bis-methylimide produced by the condensation of perylenetetracarboxylic anhydride with methylamine, (method 1), in the presence of dimerized rosin.

14. A perylene-3,4,9,10-tetracarboxylic acid N,N'-bis-methylimide pigment according to claim 13 which is produced by a process which comprises comminution of a mixture comprising 65-10 parts by weight of perylene-3,4,9,10-tetracarboxylic acid N,N'-bis-methylimide produced by methylation of perylenetetracarboxylic imide with an alkylating agent (method 2) and 35-90 parts by weight of perylene-3,4,9,10-tetracarboxylic acid N,N'-bis-methylimide produced by the condensation of perylenetetracarboxylic anhydride with methylamine, (method 1), in the presence of from 0.02 to 0.4 parts by weight of dimerized rosin.

15. A method of coloring high molecular weight organic materials, which comprises incorporating an effective pigmenting amount of a perylene pigment according to claim 13 therein.

16. A method according to claim 15, wherein the high molecular weight organic material is present in a solvent-borne, aqueous or powder coatings system.

17. A method according to claim 15, wherein the high molecular weight organic material is selected form the group consisting of cellulose ethers and cellulose esters, natural and synthetic resins, polycarbonates, polyolefins, rubber, casein, silicone and silicone resins, individually or in mixtures.

18. A pigmented composition comprising a high molecular weight organic material and an effective pigmenting amount of a perylene pigment according to claim 13.

19. A composition according to claim 18, which comprises 0.01 to 30% by weight, based on the weight of the high molecular weight organic material to be pigmented, of the perylene pigment.

20. A composition according to claim 18, which is a toner composition.

21. A composition according to claim 18, which is an inkjet composition.

* * * * *